United States Patent
Vu

(10) Patent No.: US 8,374,816 B2
(45) Date of Patent: Feb. 12, 2013

(54) AUTOMATIC DATA COLLECTION ALGORITHM FOR 3D MAGNETIC FIELD CALIBRATION WITH REDUCED MEMORY REQUIREMENTS

(75) Inventor: Toan Vu, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 12/796,311

(22) Filed: Jun. 8, 2010

(65) Prior Publication Data
US 2011/0301898 A1    Dec. 8, 2011

(51) Int. Cl.
    G06F 19/00    (2006.01)
    G01C 17/38    (2006.01)
(52) U.S. Cl. .......................................... 702/92
(58) Field of Classification Search ............ 702/92
    See application file for complete search history.

(56) References Cited

U.S. PATENT DOCUMENTS

| | | | |
|---|---|---|---|
| 4,698,912 A * | 10/1987 | Fowler et al. | 33/356 |
| 5,117,375 A | 5/1992 | Worcester et al. | |
| 5,287,295 A * | 2/1994 | Ives et al. | 702/92 |
| 6,140,933 A * | 10/2000 | Bugno et al. | 340/693.5 |
| 7,225,551 B2 | 6/2007 | Fillatreau et al. | |
| 7,275,008 B2 | 9/2007 | Plyvanainen | |
| 7,353,614 B2 | 4/2008 | Parks et al. | |
| 7,451,549 B1 | 11/2008 | Sodhi et al. | |
| 7,613,581 B2 | 11/2009 | Skvortsov et al. | |
| 2002/0092188 A1* | 7/2002 | Smith | 33/356 |
| 2002/0100178 A1 | 8/2002 | Smith et al. | |
| 2007/0124076 A1* | 5/2007 | Ockerse et al. | 701/224 |
| 2008/0289203 A1 | 11/2008 | Martikka et al. | |
| 2009/0070056 A1 | 3/2009 | Vocali et al. | |

* cited by examiner

Primary Examiner — Cindy H Khuu
(74) Attorney, Agent, or Firm — Fogg & Powers LLC

(57) ABSTRACT

A magnetic compass comprising a magnetometer for taking readings of a magnetic field and a processing unit that calibrates the magnetic compass is provided. The processing unit is configured to validate a predetermined number of magnetic field samples and calculate calibration coefficients from the validated magnetic field samples. Each validated magnetic field sample is at least a minimum separation angle apart from every other validated magnetic field sample.

20 Claims, 5 Drawing Sheets

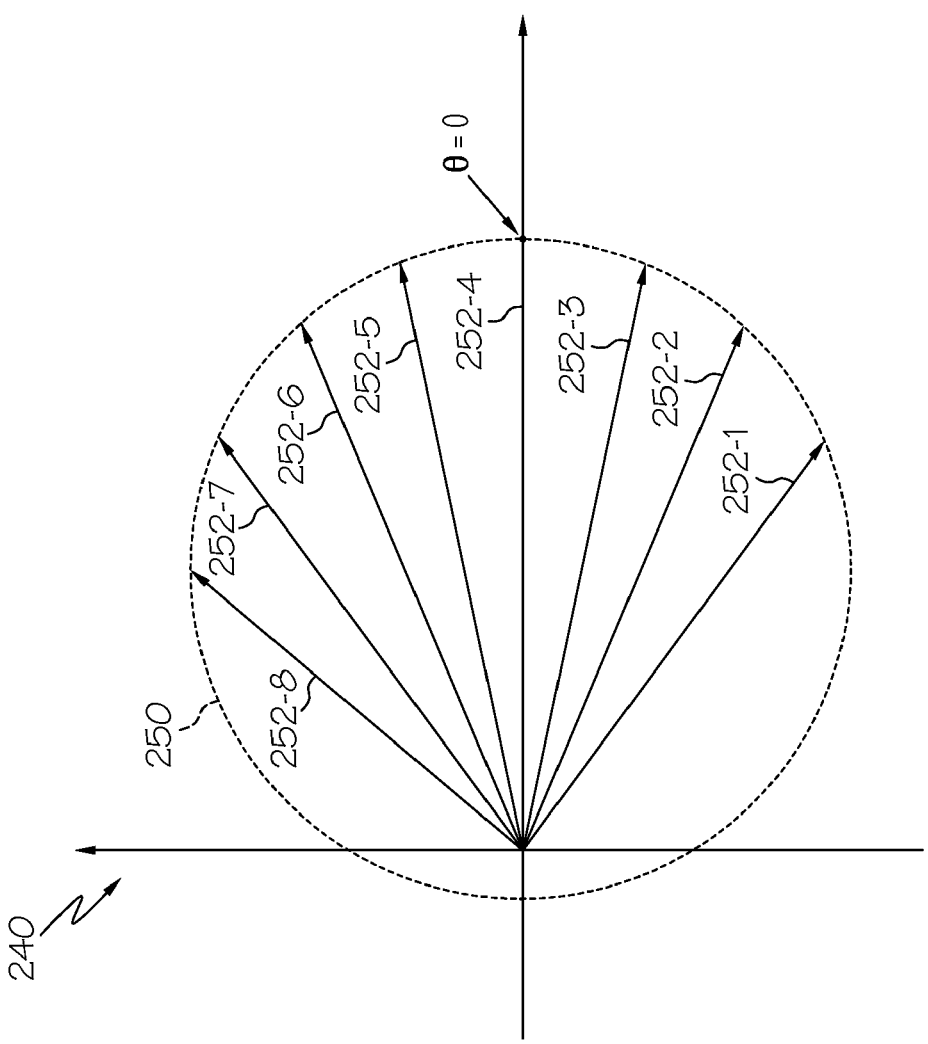

US 8,374,816 B2

AUTOMATIC DATA COLLECTION ALGORITHM FOR 3D MAGNETIC FIELD CALIBRATION WITH REDUCED MEMORY REQUIREMENTS

BACKGROUND

A magnetic compass is typically integrated with other components that distort the Earth's magnetic field, thereby compromising the accuracy of the compass. These disturbances are usually corrected with a field compensation mechanism that determines compensation coefficients to correct magnetic field readings. The quality of the compensation coefficients depends on the data set of magnetic field samples taken, which typically spans 3D space with sufficient variation in orientation of the samples. These methods may require a user to perform tedious and time consuming tasks such as holding the device steady in several orientations while the data is collected, moving the device in a predetermined manner, or manually selecting the data. Manually inputting data is often cumbersome as typical embedded applications have few user interface elements for user input. Furthermore, a large memory capacity can be required to store sufficient data samples in embedded applications where small size is often a premium.

SUMMARY

One embodiment is directed to a magnetic compass comprising a magnetometer for taking readings of a magnetic field and a processing unit that calibrates the magnetic compass. The processing unit is configured to validate a predetermined number of magnetic field samples and calculate calibration coefficients from the validated magnetic field samples. Each validated magnetic field sample is at least a minimum separation angle apart from every other validated magnetic field sample.

DRAWINGS

FIG. 2B is a graph illustrating one exemplary set of sample vectors of a disturbed magnetic field.

Like reference numbers and designations in the various drawings indicate like elements.

DETAILED DESCRIPTION

Embodiments described herein calibrate a magnetic compass to compensate for hard iron disturbances in the Earth's magnetic field due to devices and components integrated with the magnetic compass. In some embodiments, samples of the magnetic field at least a minimum separation angle apart from all the other samples are used to calculate compensation coefficients. In some embodiments, the minimum separation angle and a total number of samples are predetermined to ensure a three dimensional span of the magnetic field.

Figure 1:
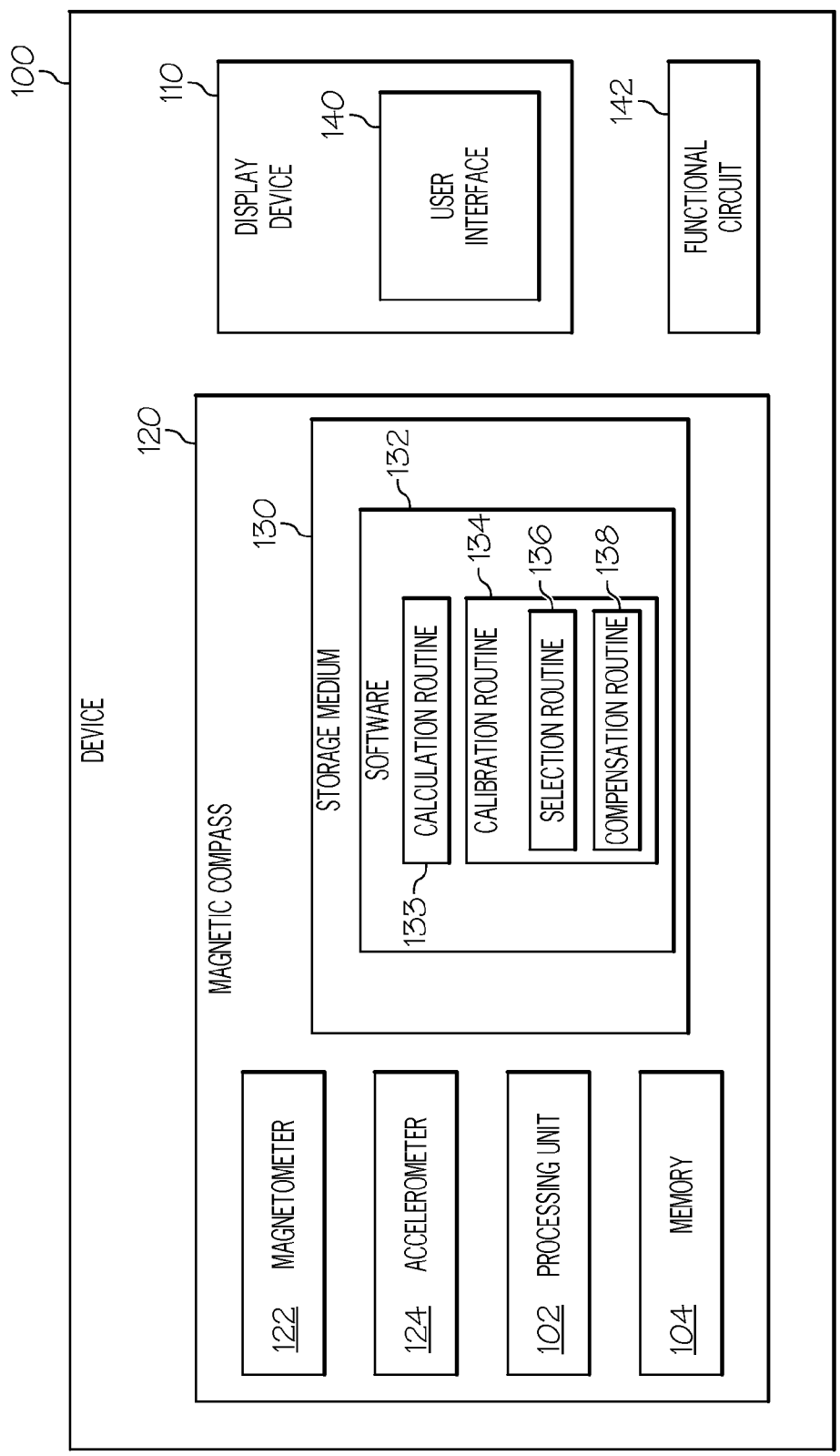
FIG. 1 is a block diagram of one embodiment of a magnetic compass integrated in a device.

FIG. 1 is a block diagram of one embodiment of a magnetic compass 120 integrated in a device 100. The magnetic compass 120 comprises at least one magnetometer 122 that takes measurements of the magnetic field it is exposed to and provides heading information for the device 100. The magnetic compass 120 further comprises a processing unit 102 and a memory 104. In the embodiment shown in FIG. 1, the magnetic compass 120 also comprises at least one accelerometer 124. The device 100 comprises a functional circuit 142 and a display device 110. The device 100 is any system or apparatus that uses heading information, such as, for example, a navigation device, vehicle, or any other apparatus. The functional circuit 142 is any circuit that uses heading information, for example, for navigation or sighting. The components of device 100 are communicatively coupled to one another as needed using suitable interfaces and interconnects.

The display device 110 displays magnetic compass readings or requests user input, for example. Embodiments of the display device 110 include a digital display, a LCD monitor, an LED display, or the like. A user interface 140 is integrated with the display device 110 and comprises physical or logical buttons for user input.

In the embodiment shown in FIG. 1, a calibration routine 134 and a calculation routine 133 are implemented in software 132 that is executed by the processing unit 102. The software 132 comprises program instructions that are stored on a suitable storage device or medium 130. Suitable storage devices or media 130 include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage device or media 130 need not be local to the device 100. In one embodiment, the storage device or media 130 is integrated within the magnetic compass 120. Typically, a portion of the software 132 executed by the processing unit 102 and one or more data structures used by the software 132 during execution are stored in memory 104. The memory 104 comprises, in one implementation of such an embodiment, any suitable form of random access memory (RAM) now known or later developed, such as dynamic random access memory (DRAM). In other embodiments, other types of memory are used.

The calculation routine 133 calculates heading from the magnetic compass readings. In other embodiments, the calculation routine 133 also calculates roll and pitch of the device 100. Accurate compass readings involve compensating for the changing magnetic field of the operating environment of the integrated magnetic compass 120. For example, even though a magnetic compass 120 may be calibrated at the factory for maximum accuracy, once it is integrated with other components, the disturbance introduced by the surrounding environment affects the magnetic compass 120. The calibration routine 134 compensates for magnetic disturbances to the operating environment of the magnetic compass 120.

The calibration routine 134 comprises a selection routine 136 and a compensation routine 138. The selection routine 136 validates a number of magnetic field samples that are at least a minimum separation angle apart from each other. Validating a magnetic field sample selects the sample for use in calibrating the magnetic compass and the sample is stored in memory 104; whereas an invalidated magnetic field sample is discarded. A minimum separation angle is a minimum angular value required for validation of the angle between a magnetic field sample and each of the validated magnetic field samples. The compensation routine 138 computes compensation coefficients from the validated magnetic field samples to compensate for hard iron disturbances. The compensation routine 130 is computed with any now known or later developed method, including, for example, a numerical search or a least squares method.

A hard iron disturbance arises from permanent magnets and magnetized material on the compass platform. These disturbances remain constant and are fixed relative to the magnetic compass 120 over all heading orientations for a given installation. In a non-disturbed magnetic field, the Earth's field has a constant magnitude. When plotted in 3D, the non-disturbed field is a sphere centered at the origin. The presence of a hard iron disturbance adds a constant magnitude field component that shifts the center of the sphere. A soft iron disturbance arises from interaction of the Earth's magnetic field with magnetically soft material in the vicinity of the compass. A soft iron disturbance causes the sphere to deform into an ellipsoid and depends on the compass 120 orientation. A combination of the soft iron and hard iron disturbances will result in an ellipsoid with the center shifted away from the origin. The ellipsoid can also be rotated depending on the nature of the disturbance. The calibration routine 134 transforms an ellipsoid disturbed magnetic field to a sphere located at the origin.

Figure 2A:
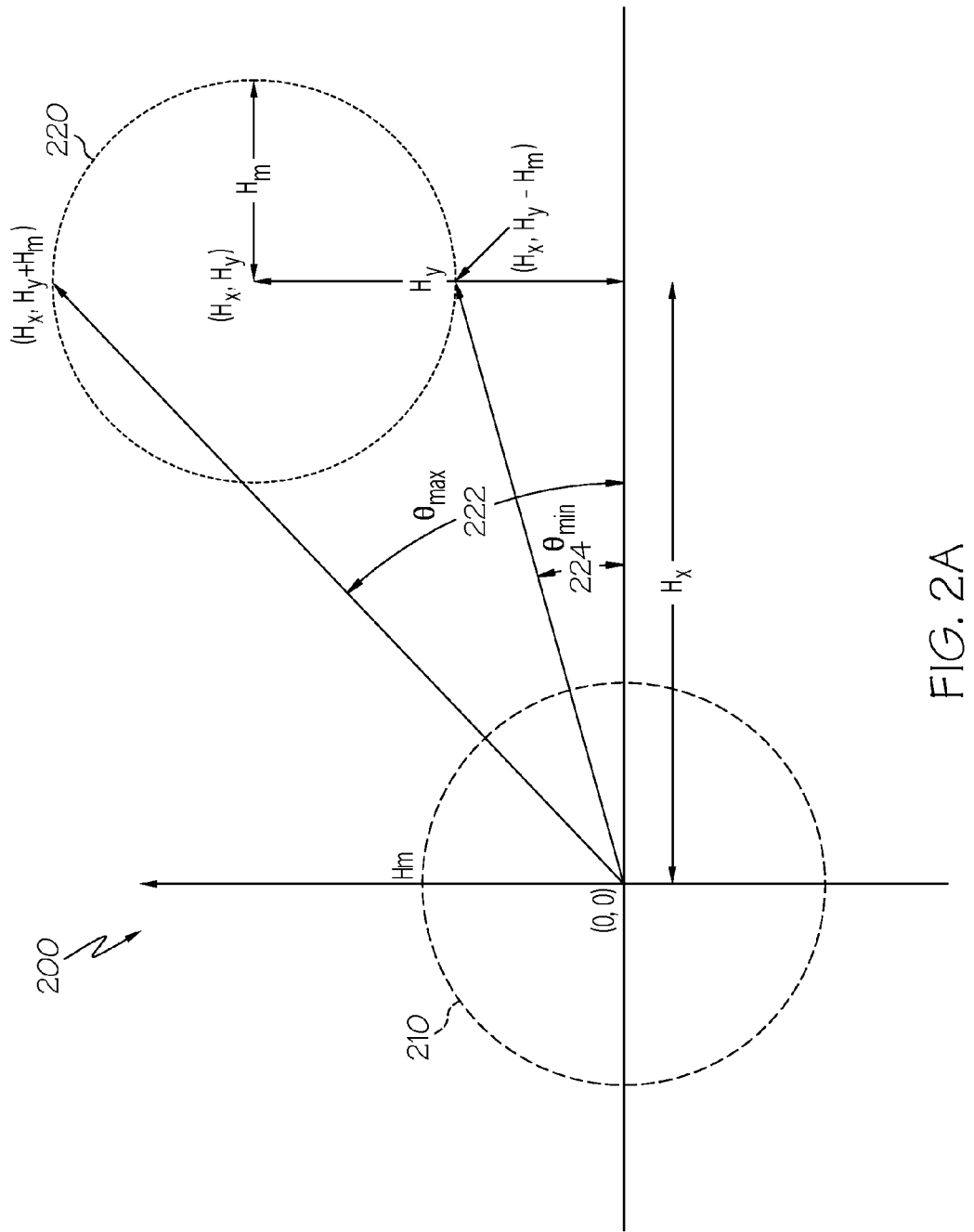
FIG. 2A is a graph illustrating a hard iron disturbance of a magnetic field.

FIG. 2A is a graph 200 illustrating a hard iron disturbance to a magnetic field. The graph 200 is shown as a two dimensional (2D) projection of a three dimensional (3D) magnetic field for simplicity, and the principals discussed herein are scalable to 3D. An undisturbed magnetic field 210 is shown centered around the origin with a radius $H_m$. In one embodiment, the undisturbed field 210 is the Earth's magnetic field. In this example, a hard iron disturbance shifts the undisturbed magnetic field 210 by $H_x$ in the positive x direction and by $H_y$ in the positive y direction. When the undisturbed magnetic field 210 is disturbed by a hard iron disturbance, the center of the sphere is shifted, but the shape of the disturbed magnetic field 220 remains a sphere with radius $H_m$. A magnetic compass integrated with the hard iron disturbance measures the disturbed magnetic field 220, which is centered at ($H_x$, $H_y$).

The angles between the origin and the highest and lowest points on the y-axis of the disturbed magnetic field 220, measured from the x-axis, are $\theta_{max}$ 222 and $\theta_{min}$ 224, respectively. These angles are given as follows:

$$\theta_{max} = \tan^{-1}\left(\frac{H_y + H_m}{H_x}\right) \quad (1)$$

$$\theta_{min} = \tan^{-1}\left(\frac{H_y - H_m}{H_x}\right) \quad (2)$$

For taking N samples, the minimum separation angle $\Delta\theta$ can be at a maximum value of:

$$\Delta\theta = \frac{\theta_{max} - \theta_{min}}{N - 1} \quad (3)$$

In one embodiment, the samples are at 0, $\Delta\theta$, $2\Delta\theta$, $3\Delta\theta$, and so on up to $(N-1)\Delta\theta$, and in other embodiments, the samples are at least $\Delta\theta$ apart. As can be shown in equation (3), the values of N and $\Delta\theta$ are selected to satisfy the calibration routine 136. Criteria for selecting N and $\Delta\theta$ include considerations based on the available memory, computational power, and data span of the 3D space.

FIG. 2B is a graph 240 illustrating a disturbed magnetic field 250. An exemplary set of sample vectors 252-1 through 252-8 were validated for the disturbed magnetic field 250. In this example, a selection routine takes samples and requires N=8 samples with a minimum separation angle of $\Delta\theta=20$ degrees. In one embodiment, $\Delta\theta$ and N are selected to ensure magnetic field samples are taken outside a single plane and therefore span 3D.

Figure 3:
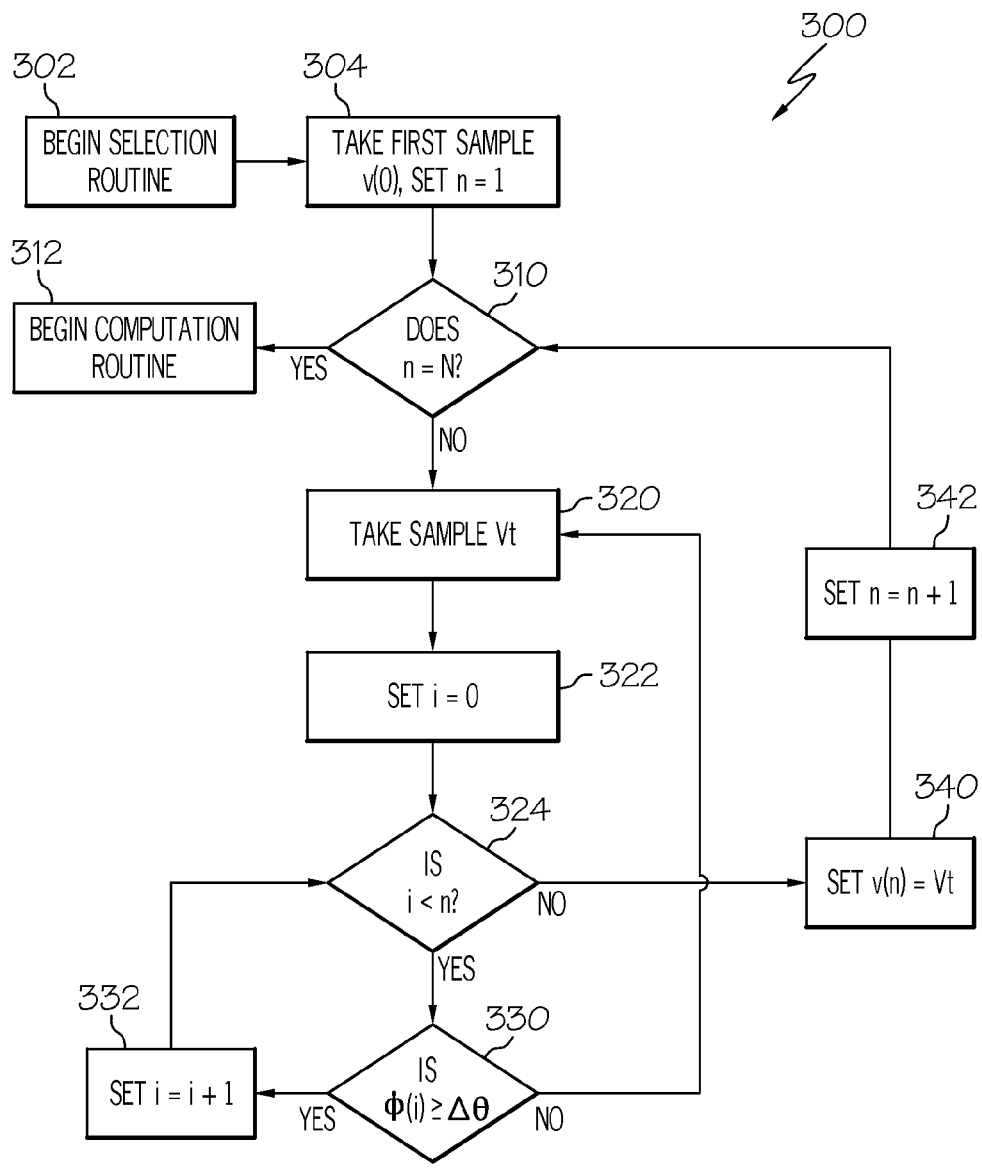
FIG. 3 is a flowchart of one embodiment of a method of validating a magnetic field sample.

FIG. 3 is a flowchart of one embodiment of a method 300 of validating a magnetic field sample. A selection routine is initiated (block 302). Upon initiation, a first magnetic field sample, referred to as a test vector, Vt, is taken. Because this is the first test vector taken, it is automatically validated and saved as v(0) and a sample count n is set to 1 (block 304). In this embodiment, a total of N magnetic field samples with a minimum separation angle of $\Delta\theta$ are validated and saved for computation of the calibration coefficients. In one embodiment, the first sample taken, v(0), when n=1, is always qualified.

The method 300 queries whether the total number of samples N have been taken, in other words, whether n=N (block 310). If the total number of samples N has been validated, a compensation routine begins that computes the calibration coefficients (block 312). If n≠N, another magnetic compass reading, Vt is taken (block 320).

The validation of the test vector is based on a minimum angular separation of all of the magnetic vectors. Thus, a test vector Vt will be compared with all the previously validated magnetic field samples (for example, v(0), v(1), and so on) to ensure that an angle between Vt and the validated sample, v(i), referred to as $\phi(i)$, is greater than or equal to $\Delta\theta$. To ensure the test vector Vt is qualified over all the other samples v(i), an index used to count through the previous qualified samples, i, is set to zero to begin the validation process (block 322).

The method 300 determines if i<N (block 324). If i is less than N, it is determined whether the angle $\phi(i)$ between the test vector Vt and a validated sample v(i) is greater than or equal to $\Delta\theta$ (block 330). If $\phi(i)<\Delta\theta$ for v(i), the sample is disqualified and another sample is taken (block 320). When a test vector is disqualified it is not stored in memory for use calculating the calibration coefficients. If $\phi(i)\geq\Delta\theta$ for v(i), the sample is qualified over v(i), but still has to be qualified over all other stored magnetic field samples v(i). Thus, i is incremented by one (block 332) for comparison of Vt with the next validated sample, and the loop for the comparison between the test vector and the v(i) begins again (block 324).

In one embodiment, the angular separation $\phi(i)$ is computed by using the inner product between unit vectors, V and U(i) pointing in the same direction as the magnetic samples Vt and v(i). For each previously validated magnetic vector samples v(i) (for example, v(0), v(1), etc.), a corresponding set of unit vectors are stored as U(i), I=1, ..., k. The test vector will only be validated and stored if and only if:

$$a\cos(<V, U(i)>) \geq \Delta\theta \text{ for all } i=1, \ldots, k. \quad (4)$$

Once i=n, the angles between the test vector and all the previously validated samples, $\phi(i)$, have been compared. In other words, once equation 4 is true, U(k+1)=V and the magnetic sample test vector Vt is stored as a valid data point. In other words, when i is not less than n (block 324), Vt is stored as v(n) (block 340). Then n is incremented by one (block 342) and it is determined whether the maximum number of samples N have been stored by comparing if n=N (block 310). Once the number of validated samples equals the desired number of samples N, data collection is complete and the computation routine begins to compute the calibration coefficients (block 312).

Figure 4:
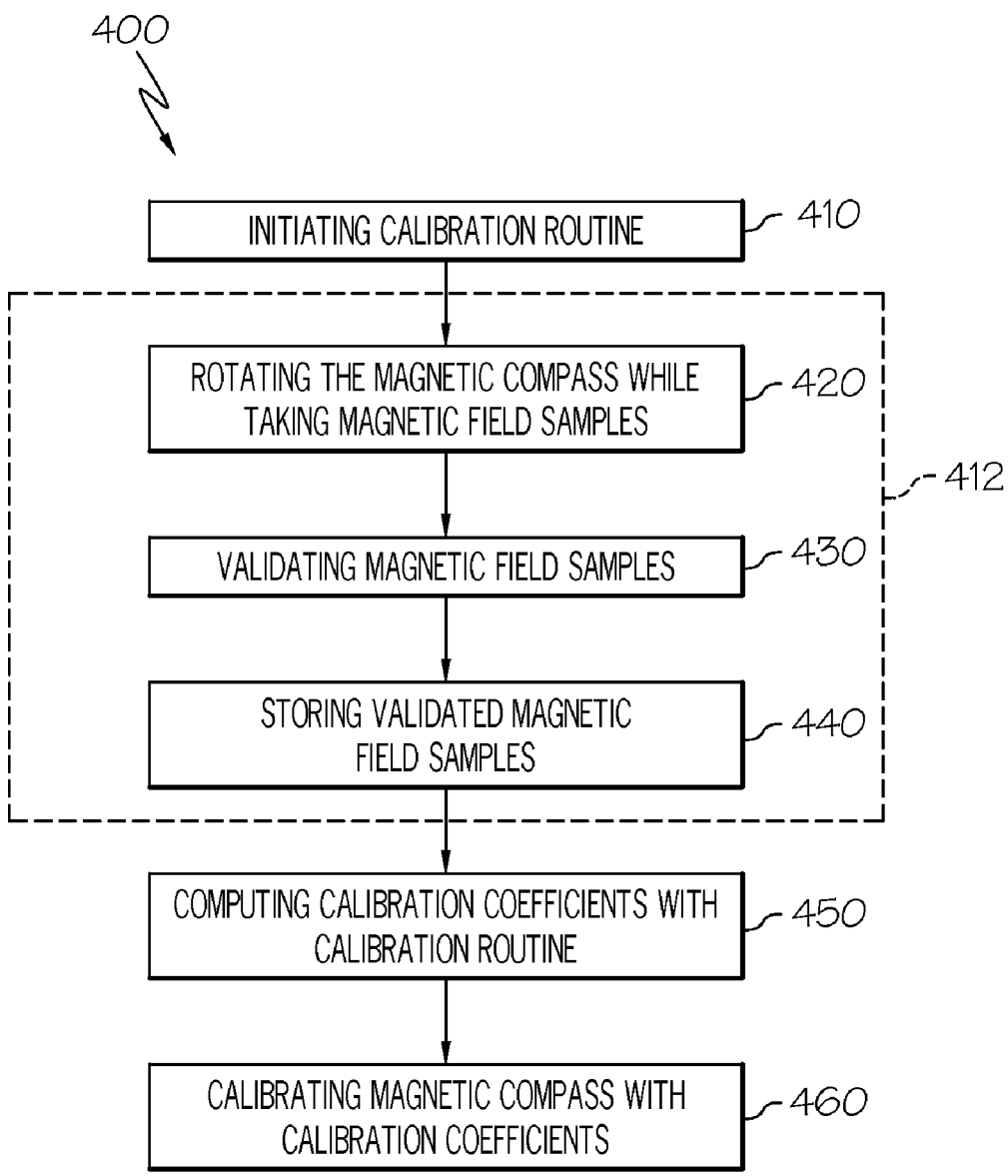
FIG. 4 is a flowchart of one embodiment of a method of calibrating a magnetic compass.

FIG. 4 is a flowchart of one embodiment of a method 400 of calibrating a magnetic compass 120. A calibration routine 134 is initiated upon, for example, a user command or upon powering up the magnetic compass (block 410). In one embodiment, an indication is made that the selection routine 136 is running. In another embodiment, an indication is made to a user to the integrated magnetic compass 120. In yet another embodiment, the user selects how many total samples N and at what minimum separation angle Δθ are to be taken. In some exemplary embodiments, N equals 6 to 24, but can be any suitable number.

Once the calibration routine has begun, a selection routine 412 begins. The selection routine comprises rotating the magnetic compass 120 while taking magnetic field samples (block 420). The selection routine comprises 412 further comprises validating each magnetic field sample taken that is the minimum separation angle Δθ apart from all the other samples (block 430). In one embodiment, the first magnetic field sample is automatically validated. Magnetic field samples are validated by recursively comparing the angle between the magnetic field sample and all previously validated magnetic field samples to ensure the magnetic field sample is at least a minimum separation angle apart from all previously validated magnetic field samples.

When a magnetic field sample is validated, it is stored in memory 104 (block 440). In another embodiment, a message indicating the first sample has been validated and stored is displayed on the display device 110. Magnetic field samples are validated and stored until the total number of samples, N, has been reached. In one embodiment, an indication is displayed on the display device 110 that N samples have been collected.

In another embodiment, if the device 100 is not rotated such that N samples are validated within a predetermined time, a timeout message is displayed on the display device 110 and the selection routine 136 terminates.

Once all the samples N have been validated and stored, the selection routine 412 is complete. The compensation routine 138 begins computing the calibration coefficients (block 450). The compensation routine 138 develops a transformation matrix that maps the disturbed magnetic field 220 to a sphere, centered at the origin. The magnetic compass 120 is calibrated with the calibration coefficients (block 460). That is, the calibration coefficients are applied to future magnetic field samples to compensate for the magnetic field disturbances. In another embodiment, a magnetic compass heading is computed with the resulting calibration coefficients.

In one embodiment, the display device 110 displays a message indicating the calibration coefficients are determined and queries the user on whether the calibration coefficients should be used. If the user inputs that the calibration coefficients are to be used, the device 110 writes the calibration coefficients to memory, such as memory 104.

In one implementation of the method 400, the samples are taken autonomously without any user intervention. In another embodiment, a user can abort the calibration routine 134 at any time. In yet another embodiment, the device 100 displays no messages regarding the progress of the calibration routine 134. In one embodiment, the method 400 is completed every time the magnetic compass 120 is mounted on another device 100 or a source of magnetic disturbance is added or removed from the device 100.

The embodiments described herein apply to any application that uses magnetic compass data, including but not limited to navigation, pointing applications, and gun mounted applications. Embodiments provided herein reduce the number of user inputs required and reduce the memory required for data storage because fewer data points are stored. One embodiment of the magnetic compass calibration is used in an embedded application where memory is at a premium and user inputs can be cumbersome and complicated, such as a handheld application. An algorithm is developed to automate data collection that ensures a wide span of the 3D magnetic field.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A non-transitory program product for calibrating a magnetic compass, the program product comprising a processor-readable medium on which program instructions are embodied, wherein the program instructions are operable, when executed by at least one programmable processor coupled to the magnetic compass, to cause the magnetic compass to:
   collect a plurality of magnetic field samples while the magnetic compass is rotated;
   select a number of the plurality of magnetic field samples as validated magnetic field samples, wherein the selecting of the validated magnetic field samples is done by recursively comparing the angle between each of the magnetic field samples and all previously validated magnetic field samples to ensure the selected magnetic sample being validated is at least a minimum separation angle apart from all previously validated magnetic field samples; and
   compute calibration coefficients from the selected validated magnetic field samples, wherein the computed calibration coefficients are used to calibrate the magnetic compass.

2. The non-transitory program product of claim 1, wherein the program instructions are further operable to cause the magnetic compass to:
   select a first magnetic field sample as a first validated magnetic field sample;
   select a next magnetic field sample as a next validated magnetic field sample when the angle between the next magnetic field sample and the first magnetic field sample and the angle between the next magnetic field sample and a second magnetic field sample are both greater than or equal to the minimum separation angle.

3. The non-transitory program product of claim 1, wherein the program instructions are further operable to cause the magnetic compass to:
   store the calibration coefficients in a memory coupled to the magnetic compass.

4. The non-transitory program product of claim 1, wherein the program instructions are further operable to cause the magnetic compass to:
   indicate that a calibration routine is completed when the calibration coefficients are calculated.

5. The non-transitory program product of claim 1, wherein the program instructions are further operable to cause the magnetic compass to:
   indicate that a calibration routine has begun before the plurality of magnetic field samples are collected.

6. The non-transitory program product of claim 5, wherein the program instructions are further operable to cause the magnetic compass to:

indicate to rotate the magnetic compass when the calibration routine has begun.

7. The non-transitory program product of claim 5, wherein the program instructions are further operable to cause the magnetic compass to:
recalibrate the magnetic compass when a source of magnetic disturbance is added to or removed from a device the magnetic compass is integrated with.

8. The non-transitory program product of claim 1, wherein an angle between a second magnetic field sample and a first magnetic field sample is determined by taking the inner product of the first and second magnetic field samples.

9. A magnetic compass, comprising:
a magnetometer for taking readings of a magnetic field; and
a processing unit that calibrates the magnetic compass, wherein, during calibration, the processing unit is configured to:
select a number of magnetic field samples as validated magnetic field samples, wherein the magnetic field samples are obtained while rotating the magnetic compass, and wherein each selected validated magnetic field sample is at least a minimum separation angle apart from every other selected validated magnetic field sample; and
calculate calibration coefficients from the selected validated magnetic field samples.

10. The magnetic compass of claim 9, wherein select further comprises:
select a first magnetic field sample as a first validated magnetic field sample;
sequentially select other magnetic field samples as test vectors;
sequentially compare an angle between each previously selected and validated magnetic field sample and the sequentially selected test vector;
select a test vector as a validated magnetic field sample when the angle between the test vector and each previously selected validated magnetic field sample exceeds a minimum separation angle; and
repeat the sequential selecting and comparing until one of a predetermined number of magnetic field samples are selected as validated magnetic field samples or a predetermined time has elapsed.

11. The magnetic compass of claim 9, wherein the processing unit is further configured to:
apply the calibration coefficients to the readings of the magnetic compass.

12. The magnetic compass of claim 9, wherein the processing unit is further configured to:
store the calibration coefficients in a memory coupled to the processing unit.

13. The magnetic compass of claim 9, wherein the processing unit is further configured to:
store each validated magnetic field sample in a memory coupled to the processing unit.

14. The magnetic compass of claim 9, wherein the number of samples and the minimum separation angle are selected to ensure a three dimensional span of the magnetic field.

15. The magnetic compass of claim 10, wherein the test vector is discarded if the compared angle is less than the minimum separation angle.

16. A device for calibrating a magnetic compass, comprising:
a functional circuit coupled to the magnetic compass that uses heading information;
a magnetometer for taking readings of a magnetic field;
a processing unit that calibrates the magnetic compass based on a plurality of magnetic field samples collected while rotating the magnetic compass, wherein the processing unit is configured to:
select a number of the collected plurality of magnetic field samples as validated magnetic field samples, wherein each selected validated magnetic field sample is at least a minimum separation angle apart from every other selected validated magnetic field sample,
calculate calibration coefficients from the selected validated magnetic field samples, wherein the calculated calibration coefficients are used to compensate the readings of the magnetic field by the magnetometer; and
a memory for storing the calibration coefficients; and
a display device.

17. The device of claim 16, further comprising:
a user interface having buttons for selection integrated in the display device.

18. The device of claim 16, wherein the display device is configured to:
display a message requesting the device be rotated; and
display a message indicating that the magnetic compass is calibrated.

19. The device of claim 16, wherein the processing unit is further configured to:
select a first magnetic field sample as a first validated magnetic field sample;
sequentially select other magnetic field samples as test vectors;
sequentially compare an angle between each previously selected and validated magnetic field sample and the sequentially selected test vector;
select a test vector as a validated magnetic field sample when the angle between the test vector and each previously selected validated magnetic field sample exceeds a minimum separation angle; and
repeat the sequential selecting and comparing until one of a predetermined number of samples are selected as validated magnetic field samples or a predetermined time has elapsed.

20. The device of claim 16, wherein the processing unit is further configured to:
recalibrate the magnetic compass when a source of magnetic disturbance is added to or removed from the device.

* * * * *